Dec. 3, 1929.  F. P. GARDNER  1,737,584
DEVICE FOR SPREADING AND FEEDING FIBROUS
PLANT STALKS AND THE LIKE
Filed June 18, 1927
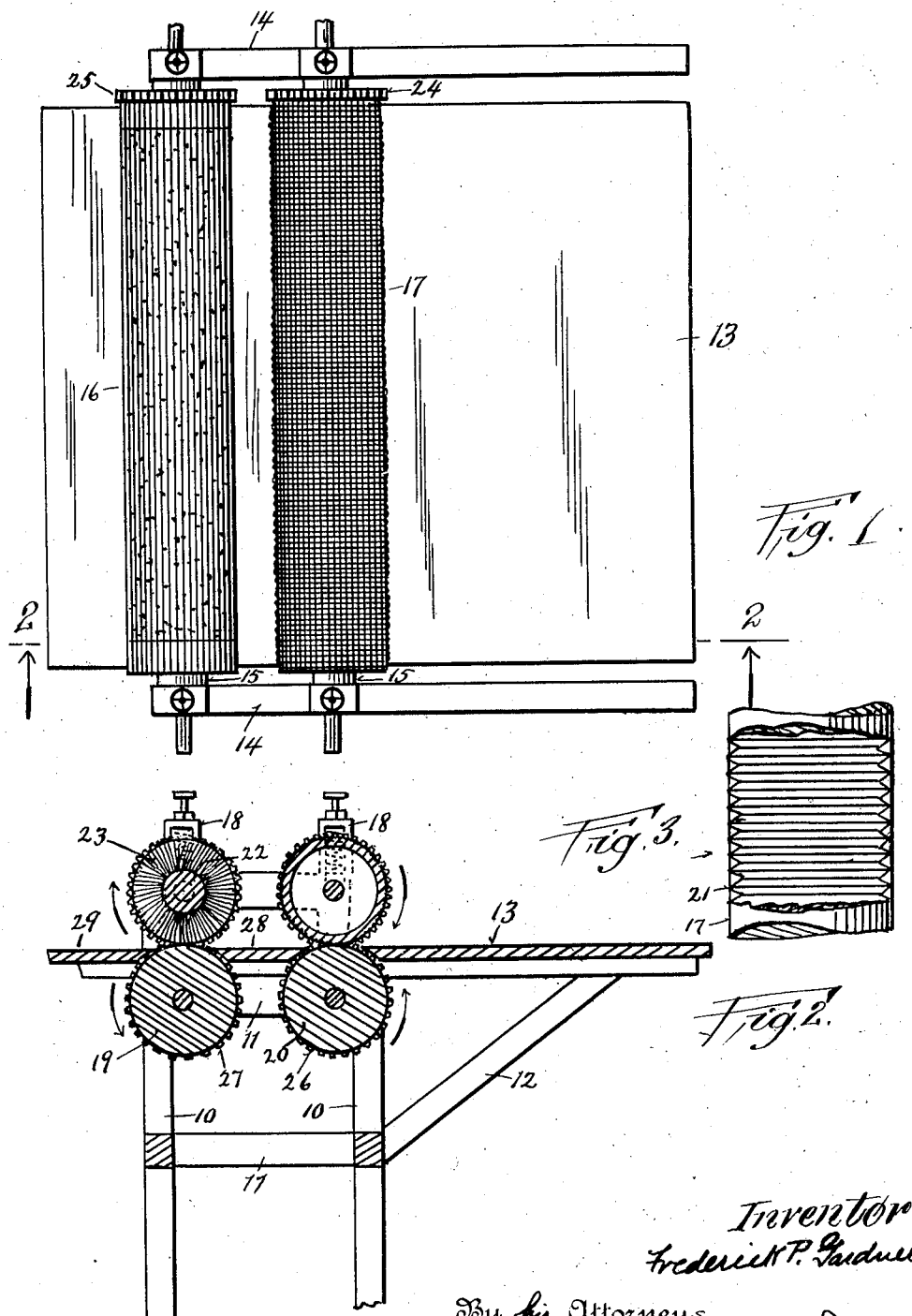
Inventor
Frederick P. Gardner
By his Attorneys
Dailey & Dailey Patented Dec. 3, 1929

1,737,584

UNITED STATES PATENT OFFICE

FREDERICK P. GARDNER, OF NEW YORK, N. Y.

DEVICE FOR SPREADING AND FEEDING FIBROUS PLANT STALKS AND THE LIKE

Application filed June 18, 1927. Serial No. 199,687.

This invention relates to a device or machine whereby straws or stalks of fibre bearing plants such as flax, hemp, ramie and others, are spread out and uniformly fed.

My device, or machine, gives a uniform distribution of the fibre bearing plant by spreading the straws or stalks evenly; it provides for a uniform and even rate of feeding regardless of the relative sizes of the material and the device does not injure the fibre or crush the straw or the stalk.

The object of my invention accordingly is the provision of an efficient and simple device which is capable of performing the above noted functions and which may be attached to a decorticating machine.

Other objects will appear hereinafter and I obtain these objects by the construction illustrated in the accompanying drawings, in which:

Figure 1 is a top plan view of a preferred form of construction,

Figure 2 is a side elevation thereof, and

Figure 3 is an enlarged view of the spreader roller.

The same reference numerals refer to like parts throughout the several views.

In a preferred form of construction, to which, however, I do not desire to be understood as being restricted, I provide a supporting frame which consists of standards 10, 10 having cross pieces 11, 11 and a brace 12 for table 13.

Two side bars 14, 14 having suitable journal boxes 15, 15 support the brush roll 16 and the corrugated feed roll 17 in tension devices 18, 18 whereby said brush and corrugated feed rolls are held in floating relation to the companion feed rolls 19 and 20.

The corrugated feed roll 17 is provided with circumferential corrugations 21 which, preferably cover the entire surface of said roll and serve to spread out and straighten the stalks or straws to provide for a semiautomatic and uniform feeding.

The brush roll 16 comprises a core 22 having bristles 23 radiating therefrom for feeding forward and further spreading or controlling the fibre bearing plant stalks or straws. The corrugated roll and the brush roll have each a drive gear 24 and 25 which meshes with similar gears 26 and 27 for driving the same in unison from any suitable source of power (not shown). The table 13 is of suitable length to afford convenient means for supporting bundles or bunches of the fibre bearing plant stalks. If desired an apron may be provided but this is ordinarily not necessary hence not shown. An intermediate table 28 between the sets of rolls and an end table 29 beyond the rolls guide the plant stalks through the feeding and arranging device to the proper operating machine for receiving the fibre from the woody part of the plant stalk or straws.

Having now described my invention what I claim as new and useful and desire to secure by United States Letters Patent is:

1. In a device for spreading and feeding plant stalks without injuring the fibre or crushing the stalks, the combination of a frame and a feed table, a pair of feed rolls including a circumferentially corrugated roll operating over said feed table for arranging the stalks in parallel, a second set of rolls including a brush roll spaced apart from said first pair of feed rolls for smoothing out the arranged plant stalks and to feed the same at a uniform rate, and tension devices for adjustably holding the corrugated roll and the brush roll above said feed rolls.

2. In a device for spreading and feeding plant stalks without injuring the fibre or breaking the stalks, the combination of a frame and a feed table, two companion feed rolls on said table, a corrugated roll above one of said feed rolls and a brush roll above either of said feed rolls, said corrugated and said brush roll being spring tensioned onto said feed rolls.

In testimony whereof I have hereunto set my hand on this 8th day of June A. D., 1927.

FREDERICK P. GARDNER.